(12) United States Patent
Mæland (10) Patent No.: US 10,940,509 B2
(45) Date of Patent: Mar. 9, 2021

(54) SYSTEM AND METHOD FOR WASHING AND DE-ICING AIRCRAFTS

(71) Applicant: MSG Production AS, Skien (NO)

(72) Inventor: Svein Gunnar Mæland, Telemark (NO)

(73) Assignee: MSG PRODUCTION AS, Skien (NO)

( * ) Notice: Subject to any disclaimer, the term of this patent is extended or adjusted under 35 U.S.C. 154(b) by 0 days.

(21) Appl. No.: 15/283,679

(22) Filed: Oct. 3, 2016

(65) Prior Publication Data

US 2018/0093783 A1 Apr. 5, 2018

(51) Int. Cl.

| | |
|---|---|
| *B64F 5/00* | (2017.01) |
| *B08B 3/04* | (2006.01) |
| *B08B 3/00* | (2006.01) |
| *B08B 3/02* | (2006.01) |
| *B64F 5/30* | (2017.01) |
| *B64F 5/23* | (2017.01) |

(52) U.S. Cl.
CPC .............. *B08B 3/003* (2013.01); *B08B 3/022* (2013.01); *B08B 3/041* (2013.01); *B64F 5/23* (2017.01); *B64F 5/30* (2017.01)

(58) Field of Classification Search
CPC .... B08B 3/041; B65F 5/20; B65F 5/23; B65F 5/30; B60S 3/004
See application file for complete search history.

(56) References Cited

U.S. PATENT DOCUMENTS

| | | | | |
|---|---|---|---|---|
| 1,814,262 A | * | 7/1931 | Redford ................... | B60S 3/004 104/172.3 |
| 3,533,395 A | * | 10/1970 | Yaste ....................... | B64F 5/20 126/271.1 |
| 3,559,659 A | * | 2/1971 | Gougoulas ................ | B60S 3/04 134/181 |
| 3,612,075 A | * | 10/1971 | Cook ........................ | B64F 5/20 126/271.1 |
| 4,378,755 A | | 4/1983 | Magnusson et al. | |
| 4,654,087 A | * | 3/1987 | Fujita ........................ | B64F 5/30 134/25.4 |
| 4,668,301 A | * | 5/1987 | Takigawa .................. | B64F 5/30 134/6 |
| 5,060,887 A | * | 10/1991 | Kean ......................... | B64F 5/20 244/134 C |
| 5,104,068 A | * | 4/1992 | Krilla ........................ | B64F 5/20 134/123 |

(Continued)

FOREIGN PATENT DOCUMENTS

WO 0192106 A2 12/2001

OTHER PUBLICATIONS

International Search Report PCT/IB2017/056070.
European Search Report EP 3 301 029 A1.

*Primary Examiner* — Marc Lorenzi (74) *Attorney, Agent, or Firm* — Hayes Soloway PC (57) ABSTRACT

The present discloses a system for washing and de-icing of aircrafts. The preset invention provides a hangar comprising three gantries to ensure different steps of the washing or the de-icing process. The structure of the gantries is essentially made of telescopic arms allowing more flexibility on the positioning of nozzle clusters during the washing and de-icing process. The use of such a mechanical system is easily accommodated to different aircraft bodies regardless their sizes. The whole functionality and positioning of the system is ensured by a programmable system.

11 Claims, 12 Drawing Sheets

(56) References Cited

U.S. PATENT DOCUMENTS

| | | | | |
|---|---|---|---|---|
| 5,318,254 | A | * | 6/1994 | Shaw ................. B25J 5/005 239/135 |
| 5,354,014 | A | * | 10/1994 | Anderson ............ B64F 5/20 134/123 |
| 6,038,781 | A | | 3/2000 | McElroy et al. |
| 2007/0028796 | A1 | * | 2/2007 | Lin ..................... B60S 3/004 104/172.3 |
| 2015/0298826 | A1 | * | 10/2015 | Luca ................... B64F 5/23 244/134 R |
| 2015/0307212 | A1 | * | 10/2015 | Petter ................. B64F 5/30 134/10 |
| 2018/0229860 | A1 | * | 8/2018 | Clermont ............ B64F 1/368 |

\* cited by examiner

SYSTEM AND METHOD FOR WASHING AND DE-ICING AIRCRAFTS

FIELD OF THE INVENTION

The present invention generally relates to a system and methods for washing and de-icing aircrafts. More specifically, the present invention relates to systems and methods for washing and de-icing aircrafts within a closed area.

BACKGROUND OF THE INVENTION

The surface smoothness of the supporting surfaces of an aircraft is considered as one of the major factors defining the aerodynamic characteristics of an aircraft. Rough surfaces increases air drag which may deteriorate the flying performance to a considerable degree and increases the fuel consumption. During flight the built-in de-icing system of the aircraft is sufficient but at ground intervals de-icing must be performed before start under unfavourable meteorological conditions.

Conventionally, de-icing and washing systems for aircrafts were hand-operated. The spraying of the de-icing liquid is generally performed by a team of operators. Such a de-icing process substantially relies on the skill of the operator, good visibility and a thorough examination of the aircraft which may lead to an incomplete de-icing process before take-off of the airplane. Improper de-icing results in ice formation on control surfaces causing a total loss or at least a substantial loss of stability and flight control. Furthermore, de-icing fluid should not be applied in the non-spraying zone, such as engines, windows or undercarriage. A hand-operated spraying doesn't guarantee to avoid such events. Meanwhile, the automatization of de-icing aims at preventing dramatic and/or disastrous effects on aircraft flight performance.

Typically, the total costs of a hand-operated de-icing can be separated into operating costs in the form of staff costs, cost of material and other costs of operation and traffic costs for the aircraft treated.

For some safety issues during the de-icing process, a general prior art solution is to keep operators and trucks further away from the aircraft. Such a solution induces more waste of de-icing fluid which causes a higher environmental contamination.

Furthermore, an automated de-icing system disclosed in U.S. Pat. No. 4,378,755, comprised a stationary gantry with stationary frames in an open environment. Such a system is affected by wind which requires a complex programmed system to place sensors or light beams to detect the wind strength.

SUMMARY OF THE INVENTION

The aforesaid and other objectives of the present invention are realized by generally providing a system and a method for washing and de-icing aircrafts within an enclosure and using a controller.

The automated system according to the present invention aims at reducing total costs than previous methods by reducing staff training costs to a minimum. The system aims at avoiding delays in the traffic program of airports by reducing the de-icing time to a third of the actual time and aims at avoiding collisions between the aircraft and a truck, thus aiming at reducing the traffic costs.

In another aspect of the invention, the automated system according to the present invention aims at increasing flexibility to change the positioning of the de-icing and washing system depending on the size and shape of the aircraft, keeping a constant amount of used de-icing liquid.

In another aspect of the invention, the system comprises a closed hangar. Such closed hangar aims at increasing safety of the solution, at avoiding complex programmed systems and at eliminating or at least substantially reducing the wind problem.

Besides the common automated de-icing system, such as the system previously disclosed in U.S. Pat. No. 4,378,755, the present invention presents a washing system which aims at improving flight performance and fuel consumption of aircraft. Such a washing system is efficient to clean all kind of surface deposits which prevents surface corrosion and improves surface smoothness.

In a first aspect of the invention, a system for washing and de-icing of an aircraft is provided. The system comprises a hangar having a base, at least one transverse frame; each transverse frame comprising at least one automated vertical elongated members adapted to move vertically, each vertical elongated member being connected to a transversal member, spray means attached to the transversal members and adapted to spray liquid below the transversal member, a controller configured to control movement of the elongated members and configured to control the spray means, a guiding mean adapted to be removably attached to the aircraft, to move the aircraft under the transverse frames of the hangar and to communicate position of the spacer to the controller. The system further comprises at least one tank for storing fluid for washing and de-icing, the tank being in fluid communication with the spray means.

In a another aspect of the invention, the transversal member may be automated and may be adapted to transversally extend and collapse, the controller being further configured to control the extension and collapsing of the transversal member. The system may further comprising a first, second and third transversal frames, the second transversal frame being adapted to move parallel to the movement of the guiding means.

In a further aspect of the invention, the vertical elongated members may be telescopic arms, the spray means may be embodied as at least one nozzle or the spray means may be embodied as at least one flush board.

In another aspect of the invention, the system may further comprise a cabin for receiving an operator.

In yet another aspect of the invention, the controller may be further configured to receive specifications of the aircraft and to control the system with regard to the specifications of the aircraft or the controller may be further configured to receive current environmental conditions and to control the system with regard to the current environmental conditions.

In a further aspect of the invention, the base of the hangar may comprise guiding rails, the guiding mean being a spacer unit adapted to be guided by the guiding rails or the base of the hangar may comprise spray means adapted to spray fluid under the aircraft.

In another aspect of the invention, the transversal member may comprise proximity sensors configured to communicate a signal based on the distance between the transversal member and the aircraft or each transversal member may comprise a plurality of sections, each section being pivotally connected to each end of the transversal member and each comprising at least one spray mean.

The present invention also provides a method for washing and de-icing an aircraft. The method comprises attaching the aircraft to a guiding mean, using the guiding mean to move the aircraft with a hangar comprising at least one transversal frame, as the aircraft moves toward a first transversal frame comprising vertical elongated arms, moving the vertical elongated arms over the aircraft body or wings without touching the aircraft, activating a first means to spray a fluid, the spray means being attached to transversal members, the transversal member being attached to one end of the elongated arms and detaching the guiding mean from the aircraft.

In another aspect of the invention, the method may further comprise communicating the position of the guiding means to a controller and controlling the movement of the vertical elongated arms and the activation of the first and second spray means using a controller based on the position received from the guiding means.

In yet another aspect of the invention, the method may further comprise communicating specifications of the aircraft and environmental conditions to the controller, changing concentration of the fluid based on the environmental conditions and further controlling the movement of the vertical elongated arms and the activation of the first and second spray means using a controller based on the specifications of the aircraft.

In a further aspect of the invention, the hangar may comprise two transversal frames. The method then further comprises as the aircraft moves toward a second transversal frame comprising second vertical elongated arms, moving the second vertical elongated arms over the aircraft body or wings without touching the aircraft and activating a second means to spray a fluid, the spray means being attached to second transversal members, the second transversal member being attached to one end of the second elongated arms.

In another aspect of the invention, the method further comprises as the aircraft moves toward a third transversal frame, being central among the other transversal frames, which comprises third vertical elongated arms, moving the third vertical elongated arms over the aircraft body or wings without touching the aircraft, moving the third central transversal frame along the length of the aircraft and inspecting quality of fluid sprayed on the aircraft The features of the present invention which are believed to be novel are set forth with particularity in the appended claims.

BRIEF DESCRIPTION OF THE DRAWINGS

The above and other objects, features and advantages of the invention will become more readily apparent from the following description, reference being made to the accompanying drawings in which.

DETAILED DESCRIPTION OF THE PREFERRED EMBODIMENT

A novel system and method for washing and de-icing aircrafts will be described hereinafter. Although the invention is described in terms of specific illustrative embodiment(s), it is to be understood that the embodiment(s) described herein are by way of example only and that the scope of the invention is not intended to be limited thereby.

The system for washing and de-icing 200 typically two mode of operations, the first mode being the washing of aircrafts and the second mode being the de-icing of aircrafts. Indeed, the washing and de-icing processes are used in non-complementary conditions as the de-icing is used in cold temperatures and the washing is used in warm conditions.

Figure 1:
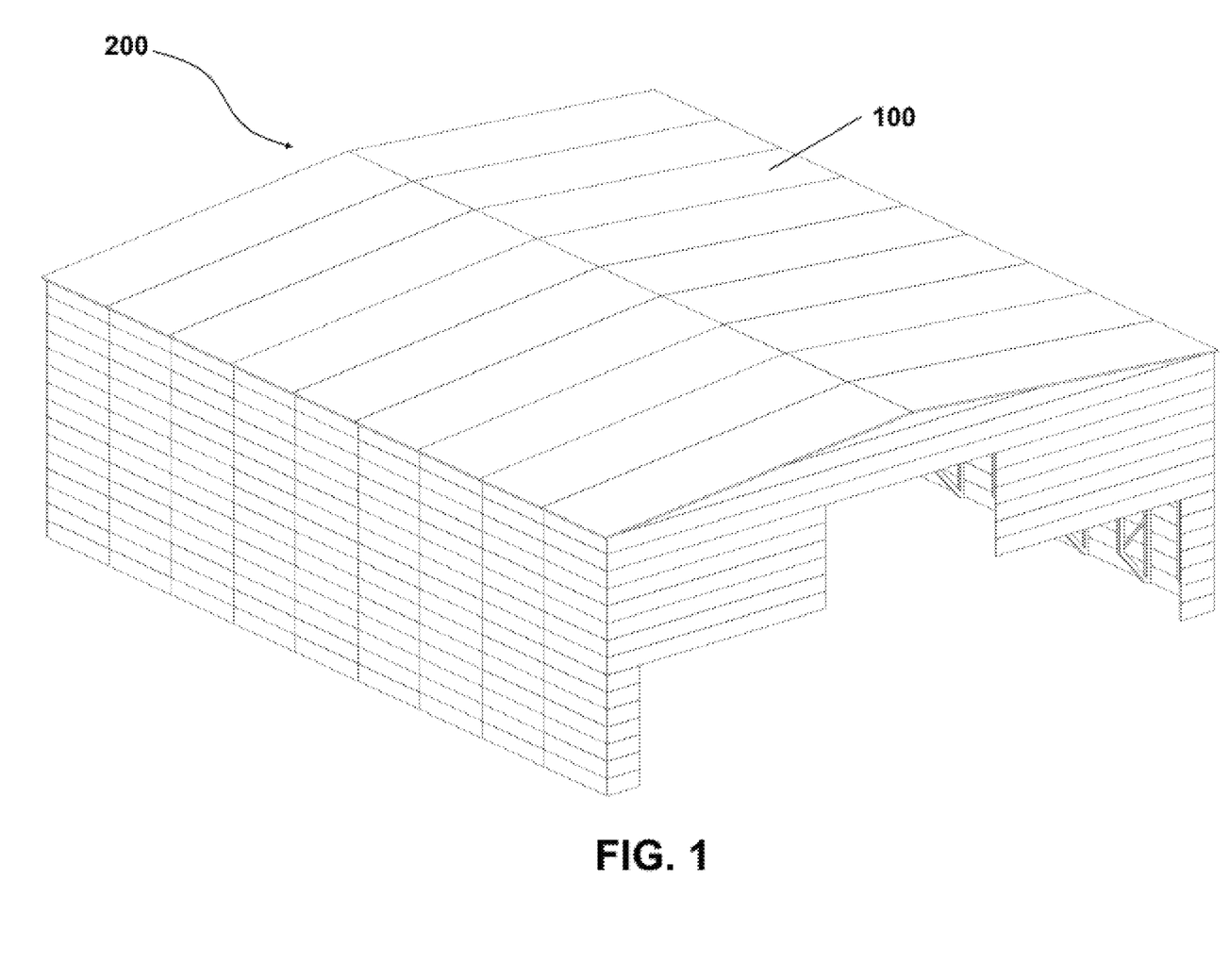
FIG. 1 is a perspective exterior view of a hangar in accordance with the principles of the present invention.

FIG. 1 illustrates a possible, but not restrictive, exterior structure of a hangar 100 providing a sufficient protection from meteorological conditions being unfavourable to washing and/or de-icing of aircrafts. In a preferred embodiment, the hangar 100 comprises wind curtains or doors to keep the washing and/or de-icing process within an enclosed environment. Understandably, in other embodiments, any other shape suitable to receive a plane may be used for the hangar 100. Furthermore, the hangar 100 may be built using any material sustaining meteorological environment, such as but not limited to, tarp, wood, cement, metal or any other suitable material.

Figure 2:
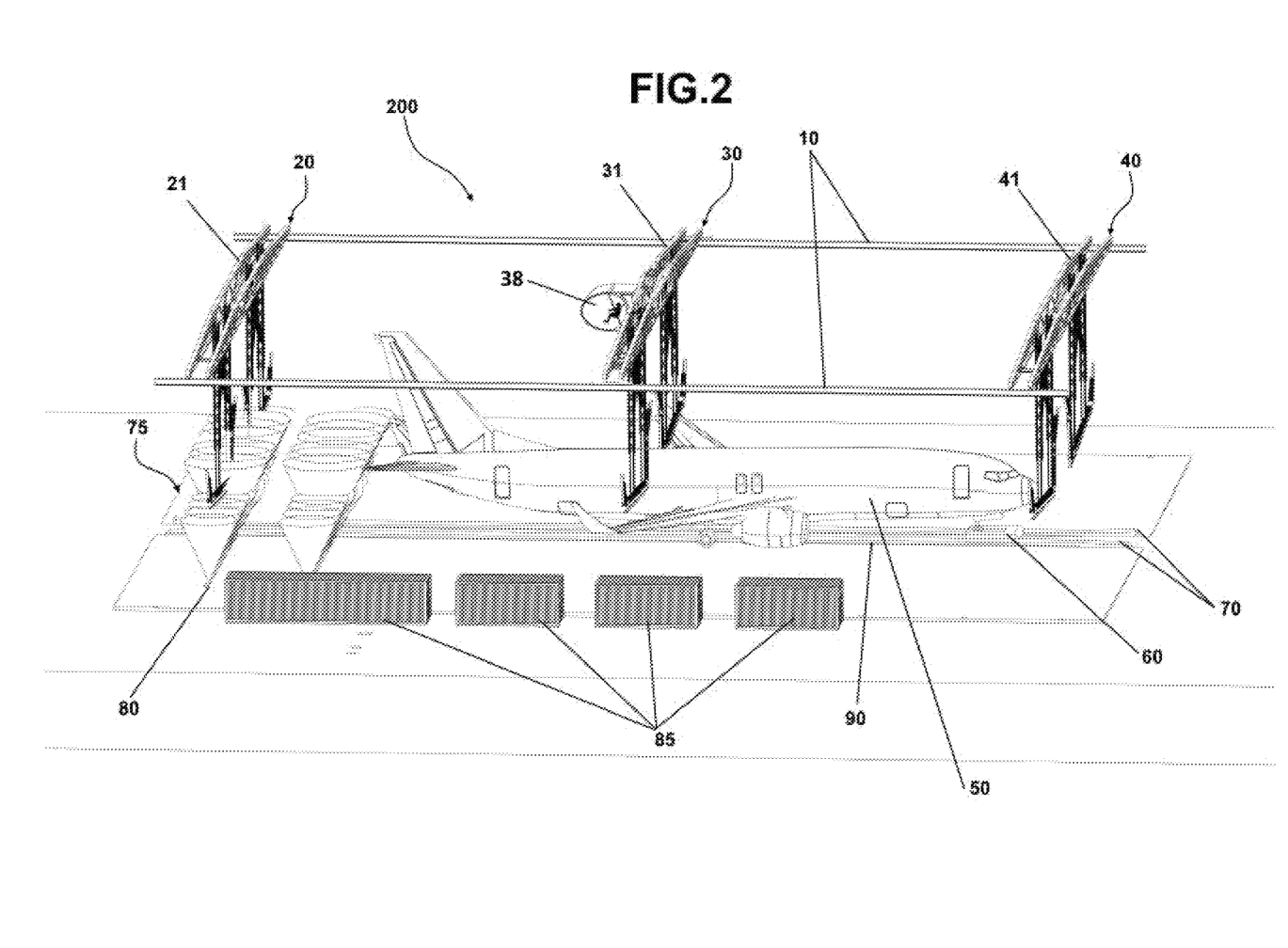
FIG. 2 is a perspective inner view of the hangar of FIG. 1 showing a de-icing and washing system in accordance with the principles of the present invention.
Figure 3:
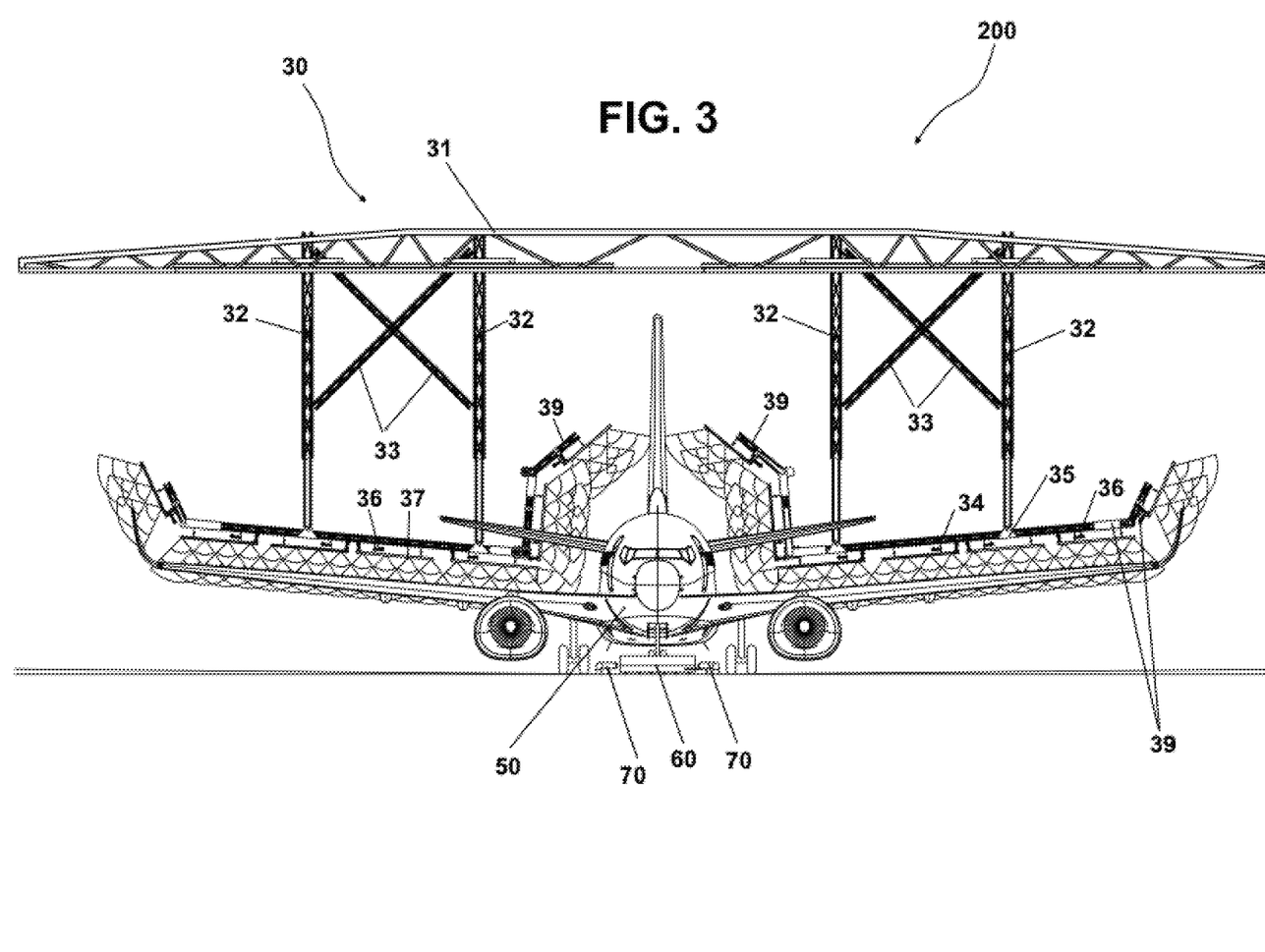
FIG. 3 is a frontal inner view of the hangar of FIG. 1 showing the de-icing and washing system in accordance with the principles of the present invention.
Figure 4:
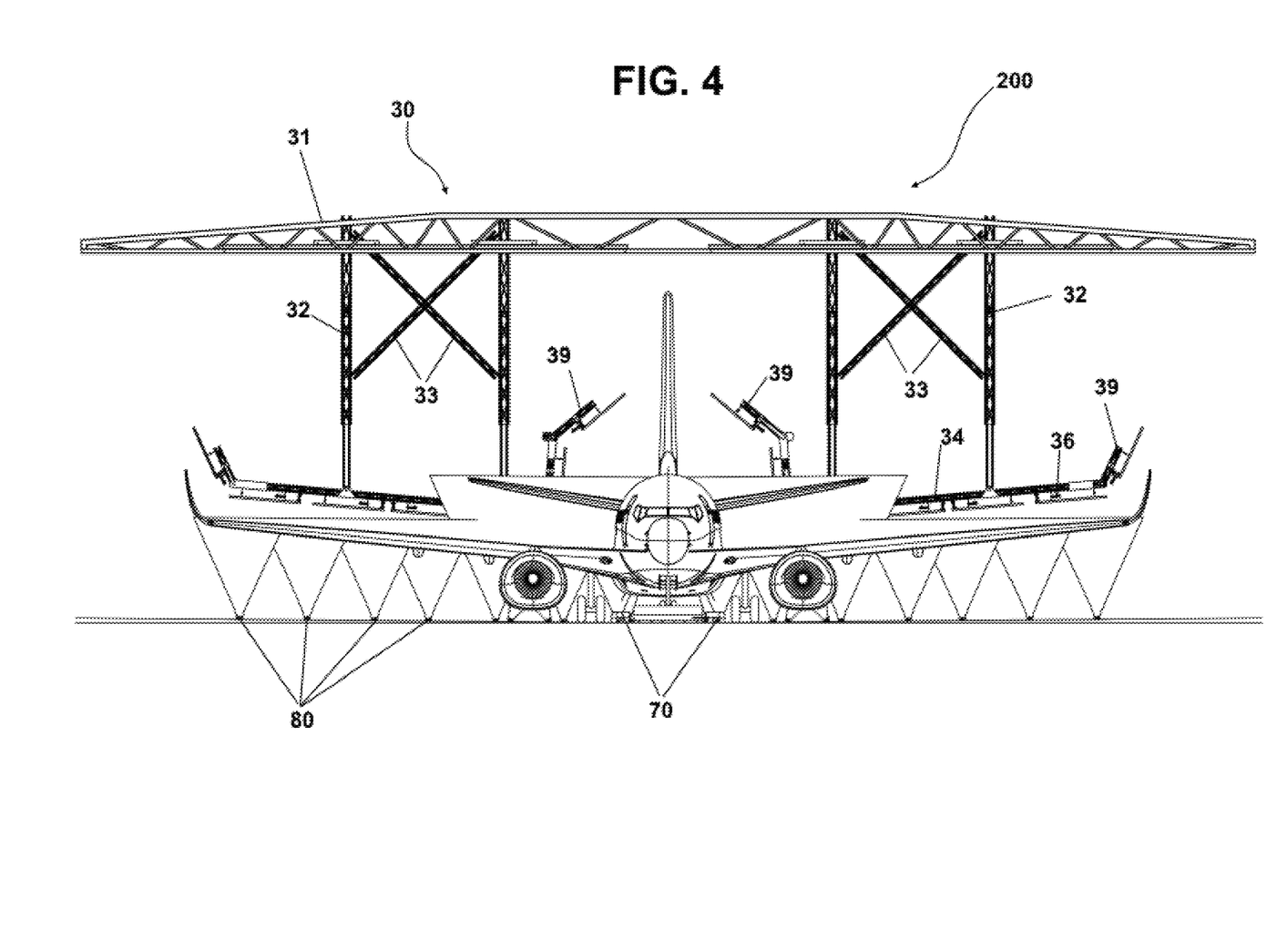
FIG. 4 is a frontal inner view of the hangar of FIG. 1 showing an under flush system in accordance with the principles of the present invention
Figure 5:
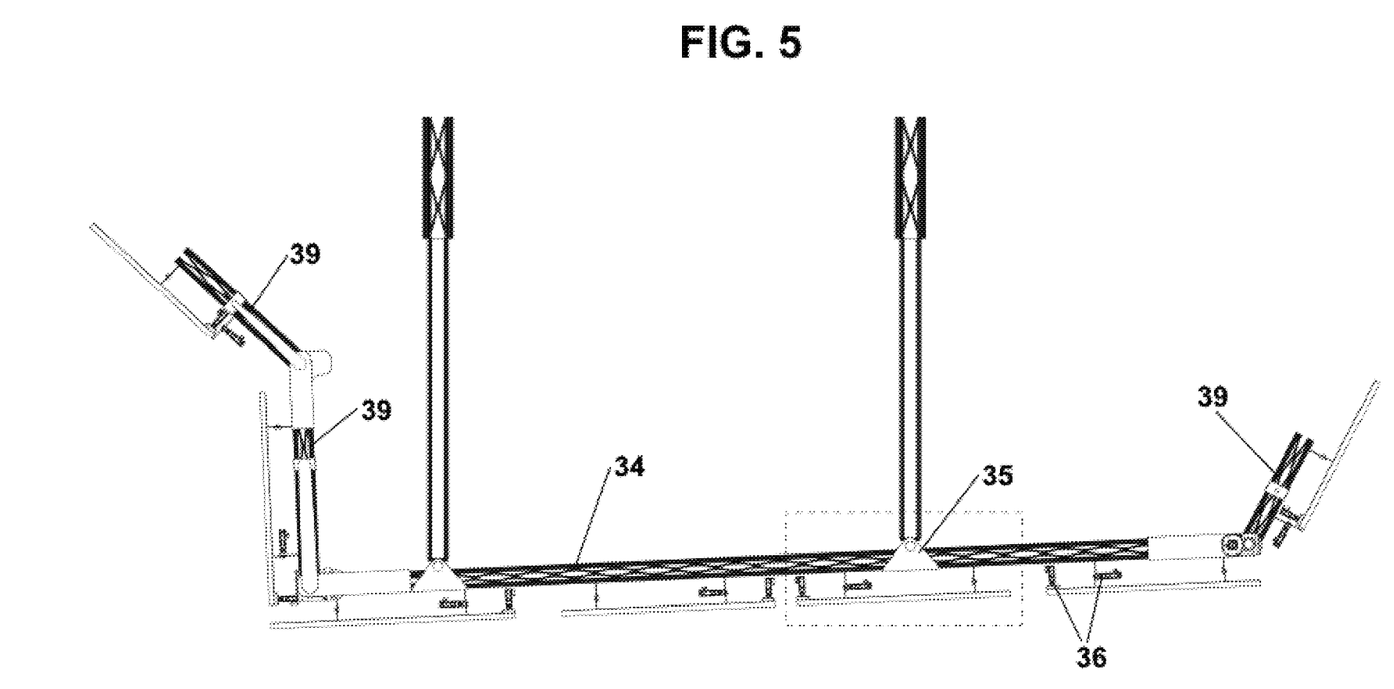
FIG. 5 is a frontal view of a part of a gantry showing a part of telescopic arms in accordance with the principles of the present invention

Now referring to FIGS. 2 to 4, a preferred embodiment of a system for washing and de-icing aircrafts 200 is illustrated. The de-icing and washing system 200 comprises three transverse frame members or gantries, 20, 30 and 40. In a preferred embodiment, the second transverse frame member may be moved along the length of the aircraft 50. Understandably, the system 200 comprising three gantries 20, 30 and 40 is shown to exemplify the invention. One skill in the art shall understand that other embodiments could use only one frame member, two frame members or more than 3 frame members.

Each frame member typically comprises upper parts 21, 31 and 41 supported by two rails 10. In some embodiments, the base 75 of the hangar 100 comprises longitudinal drainage gutters 90 adapted to collect used fluids. The said gutters 90 may be connected to one or more reservoirs or tanks 85 to store the used fluids. As shown in FIGS. 2 and 4, the base 75 may be further comprise under flush systems 80 to wash the aircraft 50. The base is typically made of concrete or any material supporting the weight of an aircraft.

Figure 6:
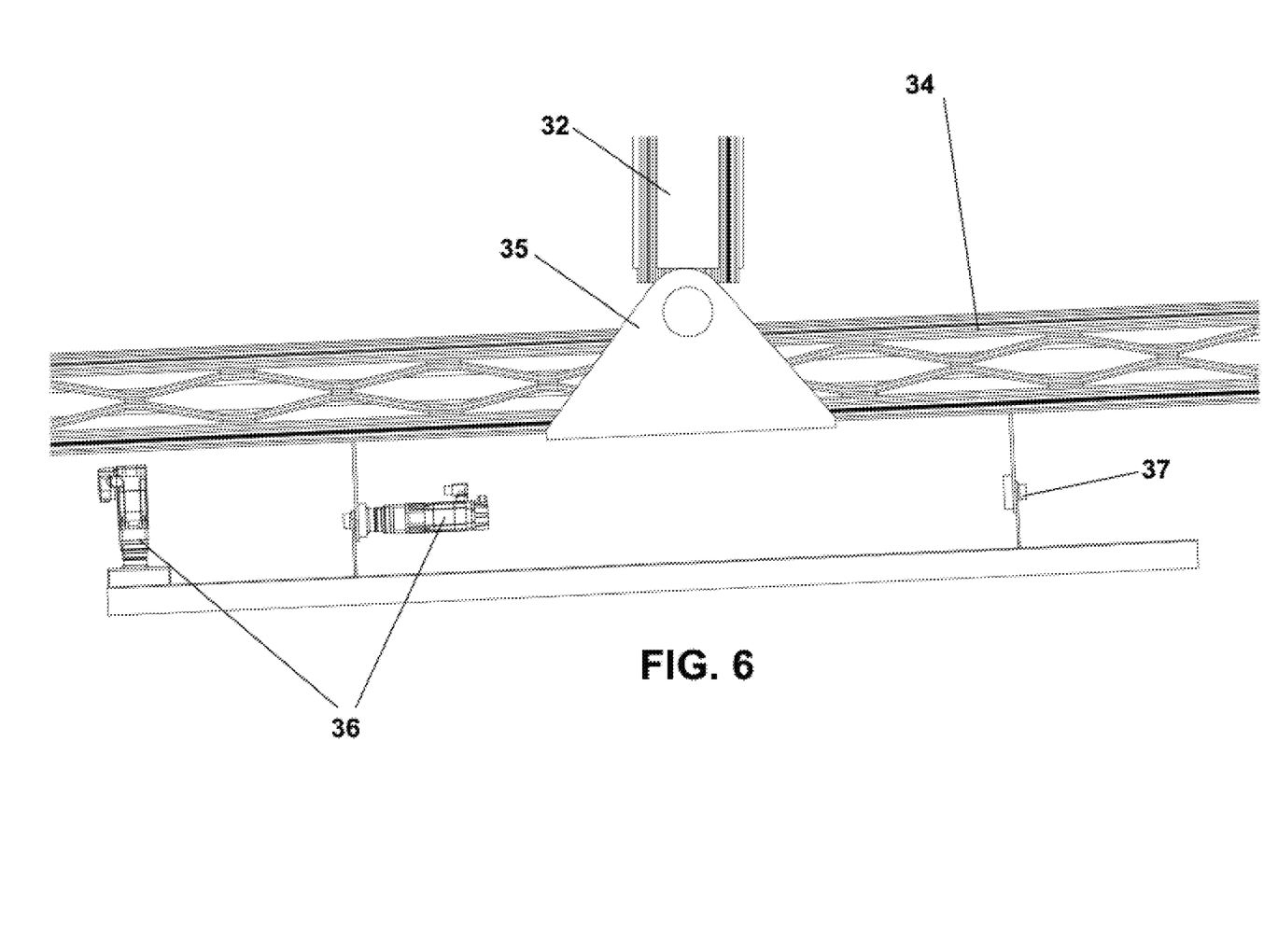
FIG. 6 is a close frontal view of the bottom part of the gantry showing the attach of telescopic arms in accordance with the principles of the present invention

Now referring to FIG. 3, each frame comprises one or more telescopic arm 32 adapted to vertically move a transversal member 34 closer to the aircraft 50. Cross structural elements 33 may be added between two or more telescopic arms 32 to reinforce the assembly, aiming at increasing the stability of the system while moving. The vertical telescopic arms 32 are downwardly attached to the frame 31. A transversal member 34 is attached to two or more telescoping arms 32 as to be maintained close to the aircraft 50. The transversal moving member 34 is typically embodied as a moving telescopic arm 34. The transversal moving member 34 is generally attached to the telescoping arms 32 using any attachment means 35 such as mechanical supports 35 as shown on FIGS. 3 and 6.

Still referring to FIG. 3, in an embodiment having three frames 20, 30 and 40, the central frame or gantry 30 may be adapted to move in-between the two outer frames 20 and 40. In other embodiments, one of the frames 20, 30 and 40 may be adapted to support a cabin 38 adapted to receive an operator. The operator is typically present to control and stop the de-icing and washing process if there is a problem. Understandably, in other embodiments, the operator may be replaced by a camera and a remote system for controlling and/or stopping the de-icing and washing process.

Each transversal member 34 may comprise different sections 39. Such sections 39 may be adapted to be independently rotating to enable the rotation of different sections of the arm to accommodate different aircraft bodies regardless their sizes. Understandably, any mean know in the art to rotate the different sections 39 may be used.

Figure 7:
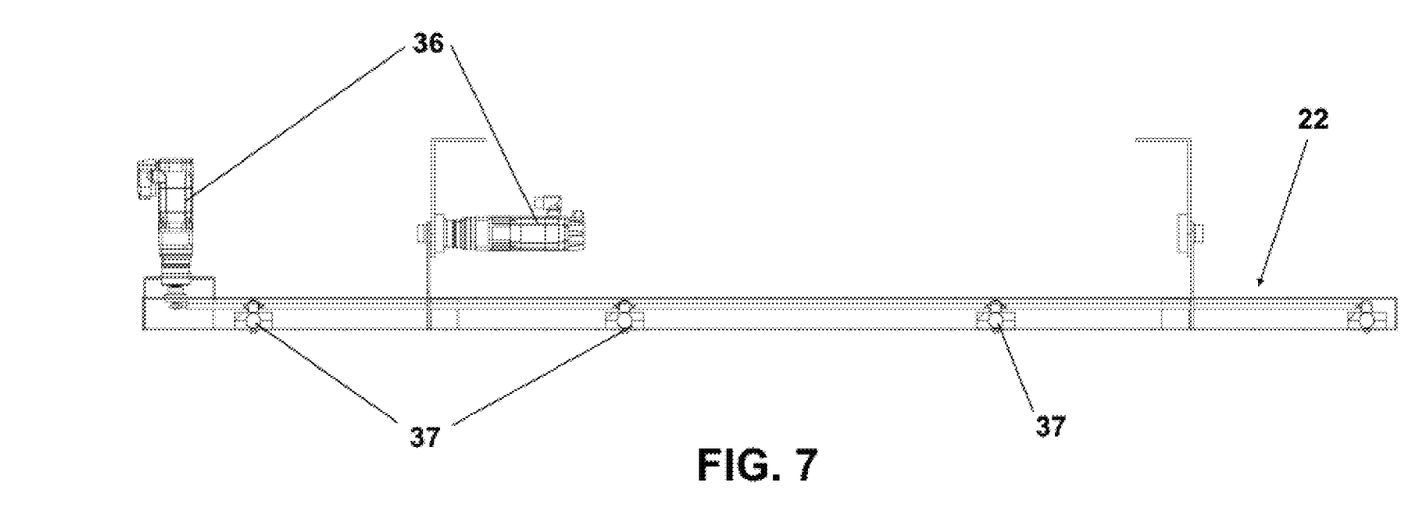
FIG. 7 is a close frontal view showing an exemplary system of flush boards and nozzle clusters supported by the horizontal telescopic arm in accordance with the principles of the present invention.
Figure 8:
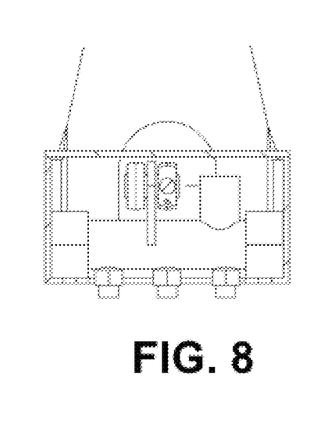
FIG. 8 is a side view showing an exemplary system a nozzle clusters in accordance with the principles of the present invention.

Now referring to FIG. 7, a flush board 22 comprises one or more fluid spraying means or devices, such as nozzle clusters 37 and engines 36 to rotate nozzle clusters and flush board. Typically, the spraying means are attached to each transversal member 34 in order to spray liquid underneath the transversal member 34 toward the aircraft 50. In a preferred embodiment, the nozzle clusters 37 and engines 36 are adapted to rotate in any direction and to rapidly sweep the surface of the aircraft, back and forth as the aircraft 50 moves under the transversal member or arm 34. The telescopic arms 32 and telescopic transversal member 34 are extended or collapsed using any mean known in the art such as actuators, hydraulic system or electric motors coupled to a gear.

In other embodiments, the transversal member 34, embodied as a telescopic arm, further comprises one or more sections 39, each section 39 being pivotally connected at each end of the transversal member 34. The pivoting sections 39 comprise spray means 36 or 37 adapted to spray the body of the aircraft 50. The pivoting sections 39 are activated using any actuator such as a piston or an electric motor to move the telescopic arm.

In some embodiments, the de-icing system is connected to a controller, such as a programmable system to enable a logic controller. The controller may be programmed to control individual pressure of each nozzle 37 or each group of nozzles, aiming at accurately controlling the washing process based on the distance from the area to be treated.

The control system may also be configured to synchronize nozzle clusters 37 and telescopic arm 34 and 32 movements. In such an embodiment, the telescopic arm 34 and 32 and the nozzles 37 must be connected to the controller.

In a preferred embodiment, the control system is preprogrammed to synchronize the movement of the telescopic arms 32 and 34 of the frames 20, 30 and 40 with the position of the guiding mean 60 along the guiding rails 70. The program enabling synchronization takes into account predetermined parameters. The predetermined parameters may be the dimension of the aircraft, the wing span, and the shape of the aircraft, the outside/inside environmental and atmospheric conditions or any other relevant parameter.

The controller may be embodied as any computerized device, any programmable controller or any type of computer system as known in the art.

In a preferred embodiment, one or more frames 20, 30 and 40 comprise one or more sensors or electro-mechanical sensors, such as, but not limited to a proximity sensor. The sensors may, for instance, be configured to send a signal when a portion of the airplane 50 is within a predetermined distance of the sensor. Upon receiving such signal, the controller request that the transversal member 34 or telescopic arms 32 be repositioned to avoid touching the aircraft.

Referring back to the FIG. 2, the aircraft 50 is shown inside the hangar 100. In a preferred embodiment, the aircraft is guided along the road way using a spacer unit 60. Such spacer unit is configured to be in communication with the controller in order to control the movement of the aircraft 50 during the de-icing/washing process. The spacer unit 60 runs between two guiding rails 70 fixed to the base 75 of the hangar 100. The spacer unit 60 aims at substantially maintaining the aircraft within a predetermined path and to continuously communicate the position of the aircraft 50 to the controller. The position of the spacer unit 60 may be determined using any proximity sensor or any other method to identify the position of the spacer unit 60, such as a precise GPS unit or any other position measurement system. In a preferred embodiment, the position of the spacer unit shall be determined using a mechanical system with cables.

In a preferred embodiment, the fluid stored in tanks 85 is re-circulated to a common manifold. The manifold is configured to adjust the concentration of the used fluid with regard to the weather conditions by adding glycol or heated water. The manifold may be in communication with the controller and adapted to adjust the concentration of fluid based a signal received from the controller. The controller may generate the signal based on the environmental conditions provided to the controller either manually or through sensors. The environmental conditions may be provided to the controller using any sensor such as electro-thermometer, barometer, wind speed sensor, etc.

Now referring to FIGS. 9 to 13, a method for washing and/or de-icing aircrafts is shown. The method generally comprises the steps for the aircraft to be attached to a spacer unit 60 and to communicate the airplane 50 specifications and/or position to the washing and/or de-icing system. In another embodiment, the specification of the aircraft could be fetched from a database or data store comprising specifications of most or all the aircraft upon identifying the type and model of aircraft or upon receiving the type and model of the aircraft 50.

The method further comprises moving at least the first vertical telescoping arms 32 at a height in accordance with the airplane 50 specifications and aiming at limiting the distance between the spray means and the aircraft 50 body.

As the aircraft 50 moves towards the first frame 20, the spray means 36 and/or 37 of the transversal member 34 are activated. Spray means 80, typically providing an under flush of the aircraft 50, at the base 75 are typically only open during the washing process (see FIGS. 9 and 10). As the aircraft 50 moves toward the third frame 30 which comprises a second set of spray means, the second set of spray means are activated (see FIG. 11—not showing activation of the spray means for clarity purposes) during the washing process.

When the system is used as a de-icing system, in an embodiment having at least three frames, as the aircraft 50 moves toward the second frame 30, a quality check is typically executed, preferably by an operator using the movable frame 30 to move above the whole plane along the length of the aircraft. In other embodiments, sensors or any mean for controlling surface quality may be used instead of an operator. As the plane approaches the third frame 40, the spray means 36 and/or 37 of the transversal member 34 are activated to apply a final treatment either polishing when the system is used as a washing system or anti-icing treatment when the system is used as a de-icing system. As the plane 50 moves away from any of the first 20, second 30 or third 40 frames, the first, second and/or third set of spray means are respectively stopped or deactivated.

The present embodiment is shown with a hangar 100 comprising 3 frames 20, 30 and 40. Understandably, the hangar 100 could be adapted to use one or two frames or more than 3 frames without departing from the principles of the present invention.

Figure 9:
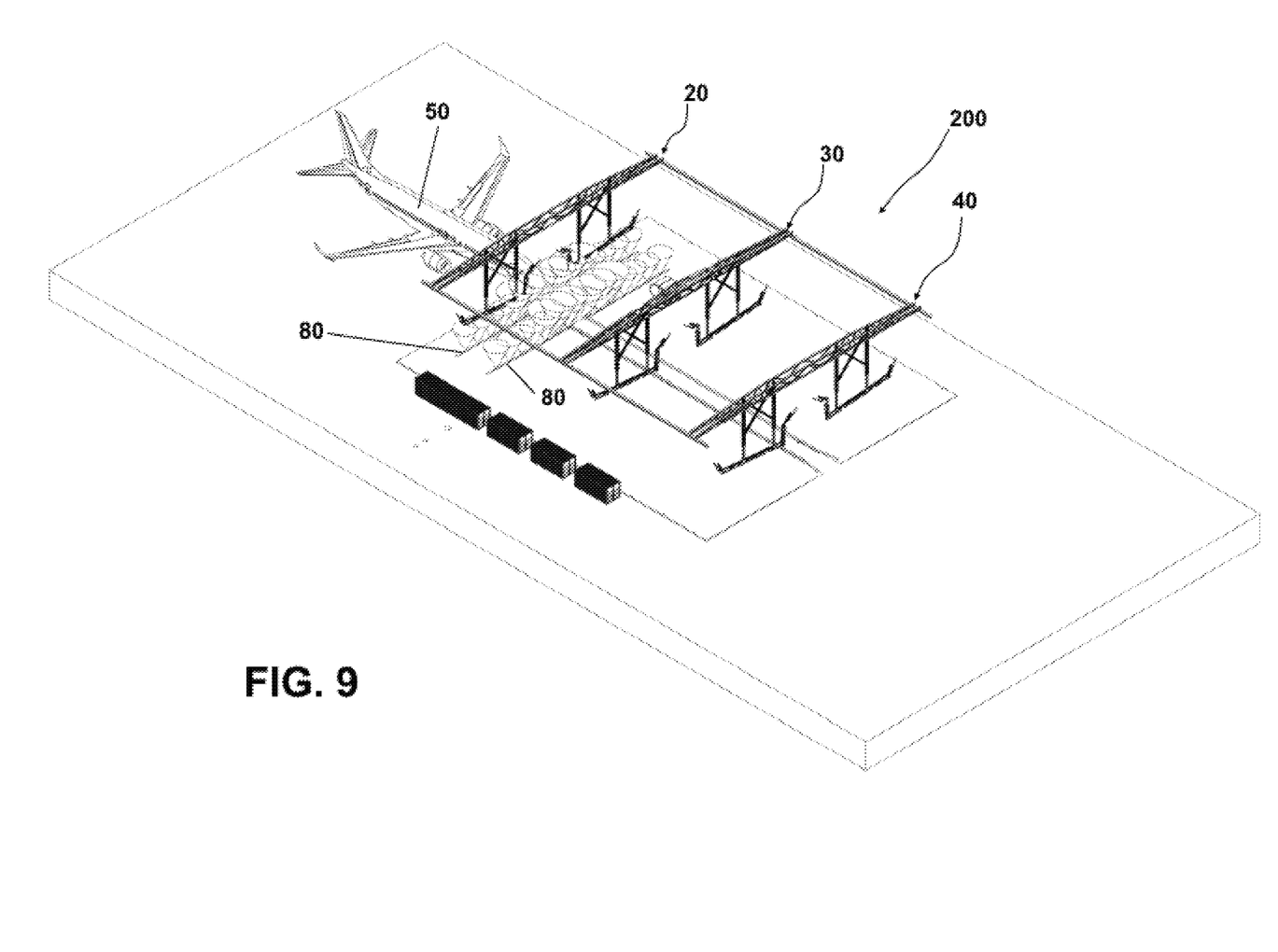
FIG. 9 is a general perspective inner view of the hangar of FIG. 1 showing a first step of the de-icing and washing process in accordance with the principles of the present invention.

In an embodiment having an operator, for both washing and de-icing, once the aircraft approaches the hangar 100, as shown on FIG. 9, the operator establishes communication with the aircraft, typically using a radio or any other mean of communication. During the communication, the conditions of the process are defined and the control system is configured to the airplane specifications. The aircraft 50 is attached to the spacer 60.

In other embodiments, the communication between the controller and the aircraft may be automated using any type of communication protocol over a network, such as LAN network, wireless communication, etc.

In a typical process of washing and/or de-icing, the plane moves, a first time, through all the way from the frame 20 to the frame 40 to be first washed and rinsed, then a second time to be de-iced. Understandably, other steps may be inserted in-between the present steps without departing from the present invention.

Figure 10:
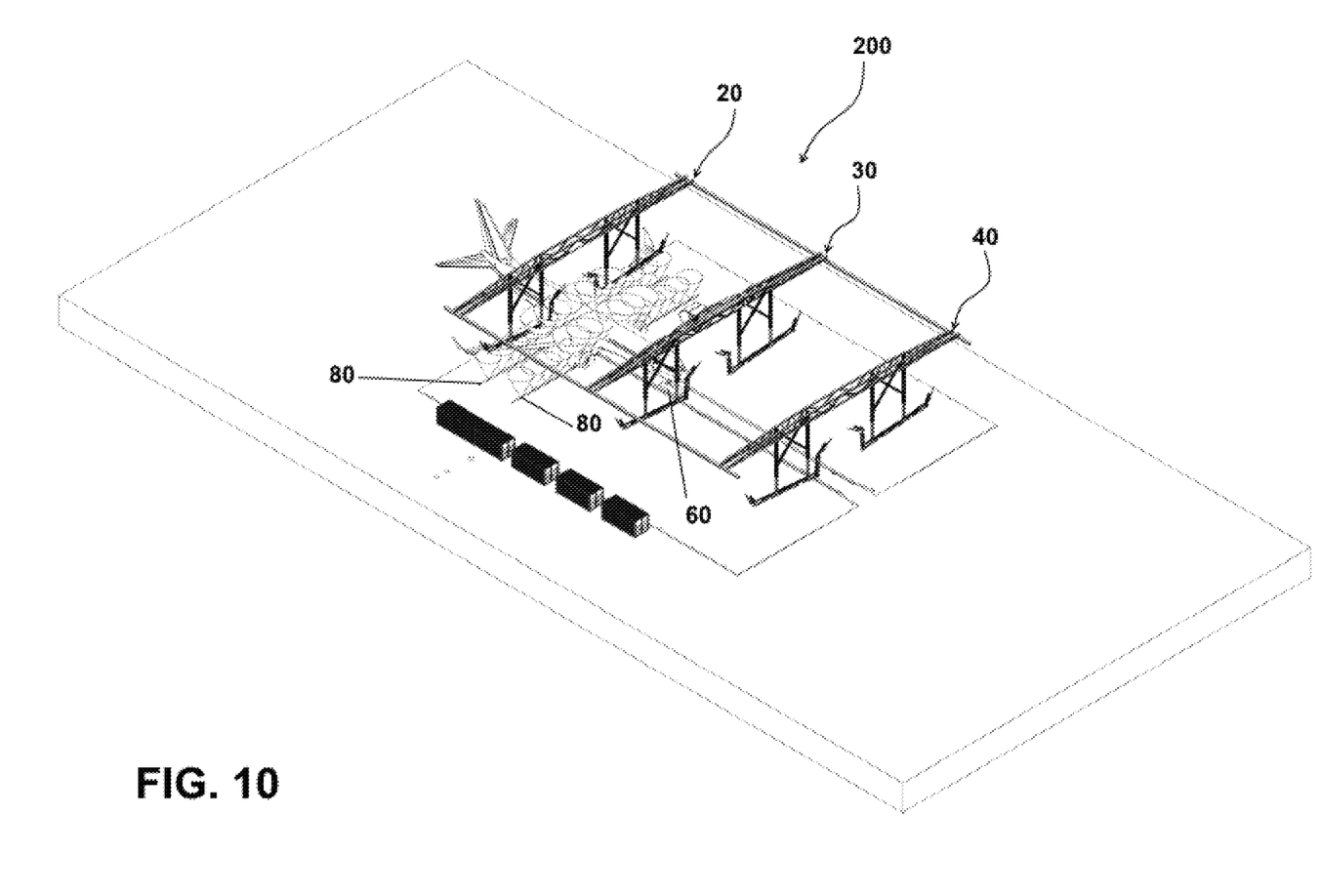
FIG. 10 is a general perspective inner view of the hangar of FIG. 1 showing a second step of the de-icing and washing process in accordance with the principles of the present invention.

Once inside the hanger 100, as shown on FIG. 10, the spacer 60 running between the two guiding rails communicate the position of the plane to the control system using any type of communication mean, such as wireless communication or wired communication. The control system is configured to control the movement and the function of nozzle clusters 37 on the frame 20 during the washing process or the de-icing process. Typically, the under flush system 80 is activated to apply foam to the underside of the aircraft 50 while the plane 50 moves by the first frame 20.

Figure 11:
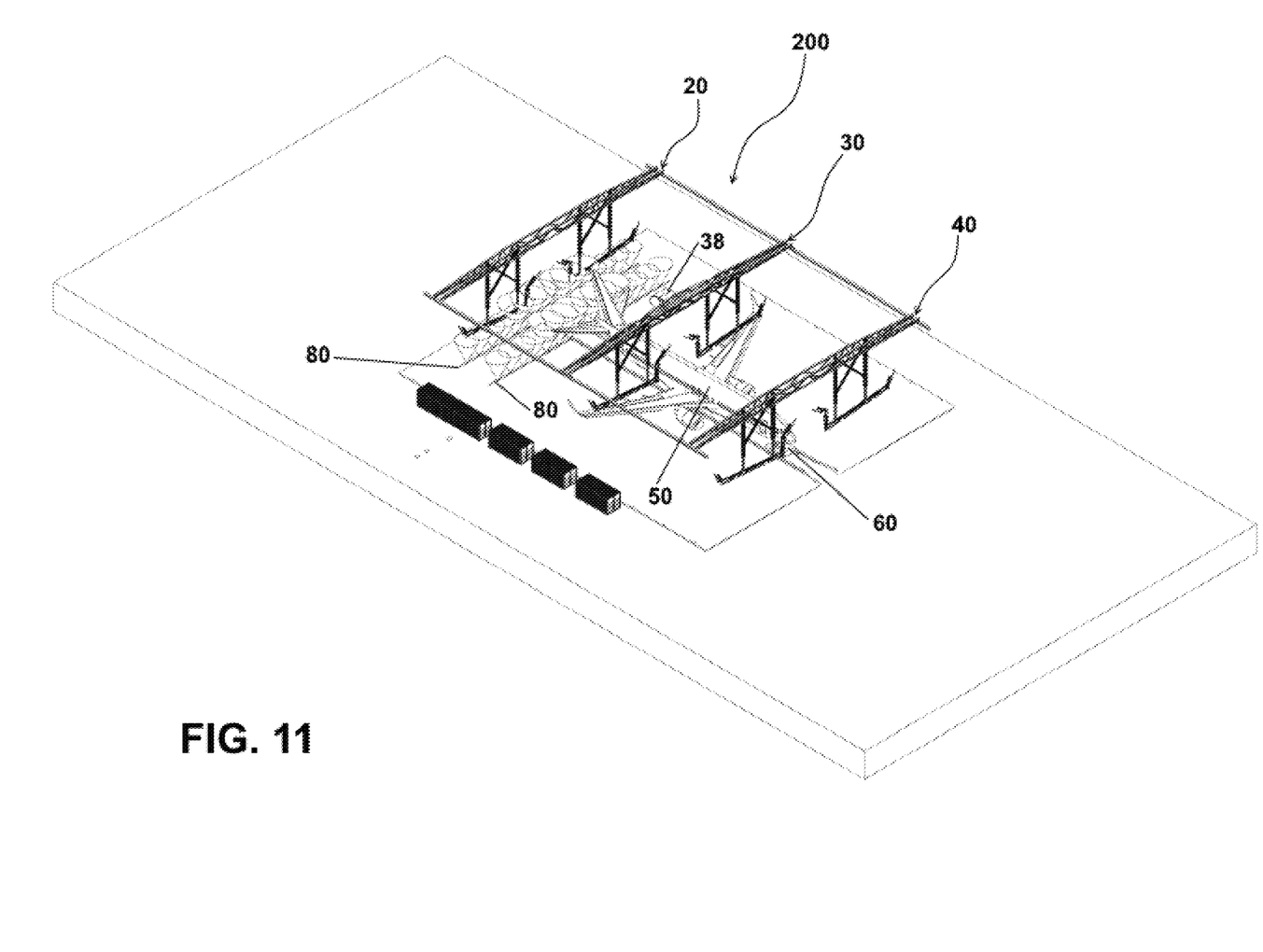
FIG. 11 is a general perspective inner view of the hangar of FIG. 1 showing a third step of the de-icing and washing process in accordance with the principles of the present invention.

Now referring to FIG. 11, the aircraft 50 is shown being washed. During the washing process and as the aircraft 50 moves toward the second frame 30, the under flush system 80 under the frame 30 is activated to remove the washing foam on both the upper side and underside of the aircraft. The aircraft is fully flushed with hot water using the spray means. Typically, during the de-icing process, as the aircraft 50 moves under the second frame 30, a manual quality check is executed by the operator using the mobile gantry 30.

Figure 12:
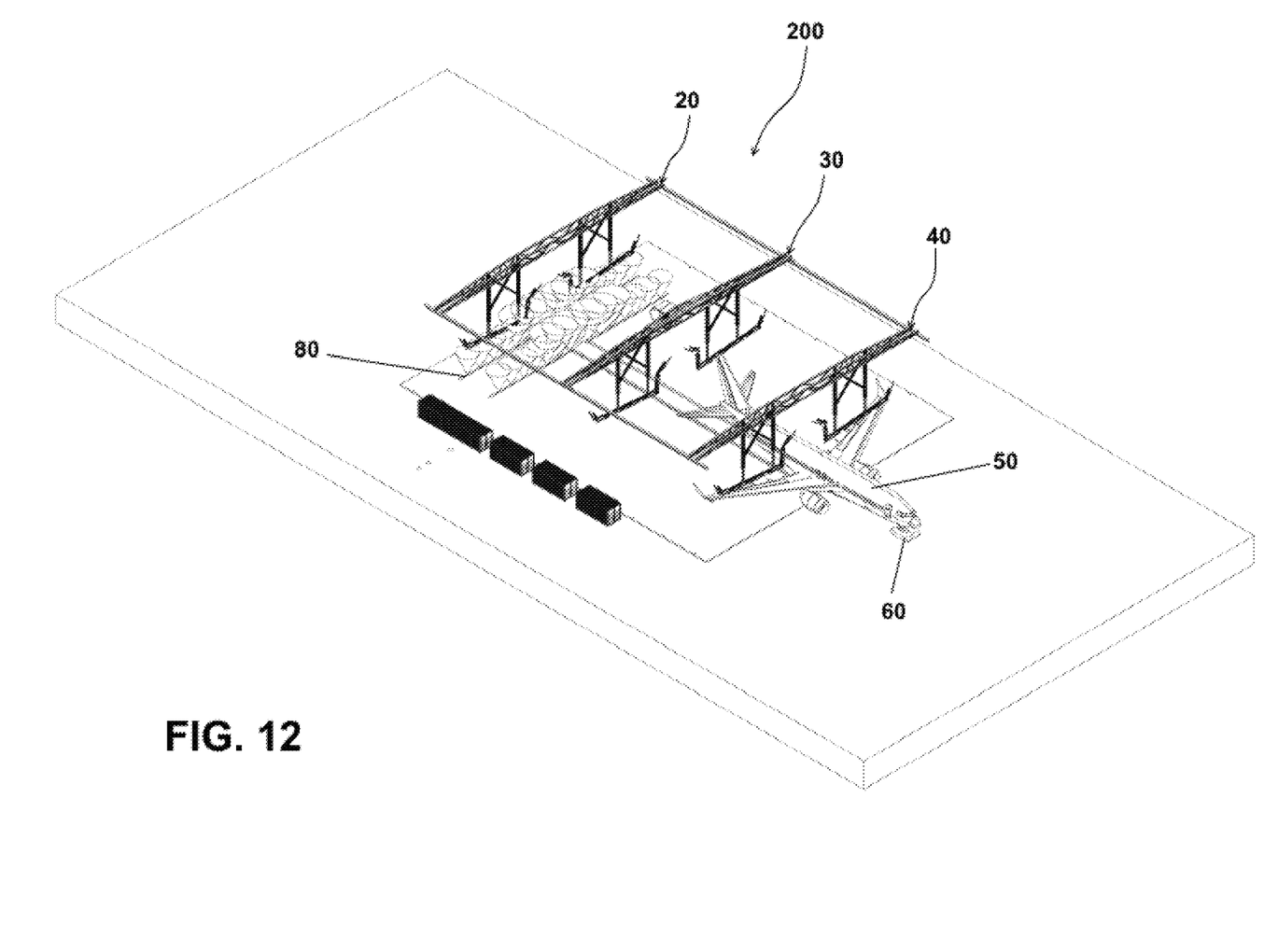
FIG. 12 is a general perspective inner view of the hangar of FIG. 1 showing a fourth step of the de-icing and washing process in accordance with the principles of the present invention.

Now referring to FIG. 12 and during the washing process, once the aircraft reaches the third frame 40, another fluid, such as but not limited to a polish liquid, is applied to the aircraft 50. However, during the de-icing process an anti-ice liquid, typically 100% Glycol, is applied to the aircraft.

Figure 13:
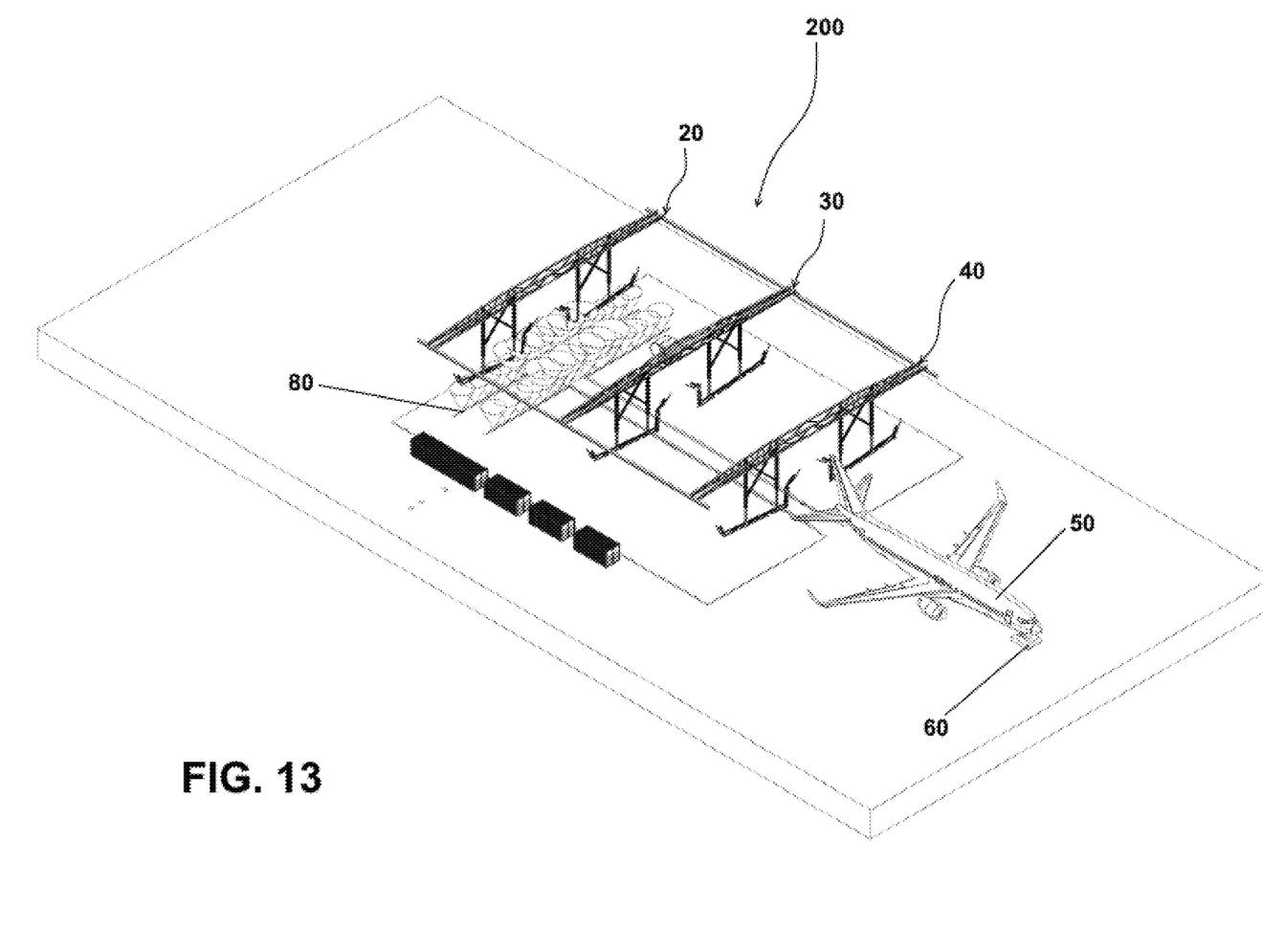
FIG. 13 is a general perspective inner view of the hangar of FIG. 1 showing a fifth step of the de-icing and washing process in accordance with the principles of the present invention.

As shown on FIG. 13, once the washing process or the de-icing process is completed, the spacer 60 pulls the aircraft about 90 degrees before being disconnected.

While illustrative and presently preferred embodiment(s) of the invention have been described in detail hereinabove, it is to be understood that the inventive concepts may be otherwise variously embodied and employed and that the appended claims are intended to be construed to include such variations except insofar as limited by the prior art.

What is claimed is:

1. A system for washing and de-icing of an aircraft, the system comprising:
    a hangar having a base;
    at least one transversal frame, each transversal frame comprising at least one automated vertical elongated member adapted to move vertically, each vertical elongated member being connected to a transversal member;
    a spraying system comprising at least one nozzle, the spraying system being attached to the at least one transversal member and adapted to disperse liquid below the transversal member;
    a controller comprising a memory to store shape and dimensions information of the aircraft;
    an aircraft pulling system adapted to move the aircraft under the at least one transversal frame of the hangar, the aircraft pulling system comprising:
        a pulling device;
        an attachment member adapted to removably attach the pulling device to the aircraft;
        a position sensor configured to identify the position of the aircraft pulling system anywhere in the hangar, the position sensor being configured to communicate the identified position to the controller;
    at least one tank for storing fluid for washing and de-icing, the tank being in fluid communication with the spraying system, the controller being in communication with the position sensor, the controller being programmed to:
        determine the position of the aircraft using the communicated position of the aircraft pulling system;
        control movement of the at least one automated vertical elongated member and to control activation of the spraying system, wherein the controller uses the determined position of the aircraft and the shape and dimensions information of the aircraft to:
            automatically synchronize the movement of the automated vertical elongated member to conform with the shape and dimensions of the aircraft; and
            automatically activate the spraying system upon positioning of the automated vertical elongated member.

2. The system for washing and de-icing of an aircraft of claim 1, the transversal member being automated and being adapted to transversally extend and collapse, the controller being further configured to control the extension and collapsing of the transversal member.

3. The system for washing and de-icing of an aircraft of claim 2, the at least one transversal frame further comprising a first transversal frame, a second transversal frame and a third transversal frame, the second transversal frame being adapted to move along the movement of the aircraft pulling system.

4. The system for washing and de-icing of an aircraft of claim 1, the at least one automated vertical elongated member being a telescopic arm.

5. The system for washing and de-icing of an aircraft of claim 1, the at least one nozzle configured to provide a flush to the aircraft.

6. The system for washing and de-icing of an aircraft of claim 1, the system further comprising a cabin for receiving an operator.

7. The system for washing and de-icing of an aircraft of claim 1, the controller being further configured to receive current environmental conditions and to control the system with regards to the current environmental conditions.

8. The system for washing and de-icing of an aircraft of claim 1, the base of the hangar comprising a second spraying system comprising at least one nozzle adapted to spray fluid under the aircraft.

9. The system for washing and de-icing of an aircraft of claim 1, each transversal member comprising a plurality of sections, each section being pivotally connected to each end of the transversal member.

10. The system for washing and de-icing of an aircraft of claim 1, the hangar further comprising guiding rails, the guiding rails being adapted to limit movement of the aircraft pulling system.

11. The system for washing and de-icing of an aircraft of claim 1, the position sensor being further configured to identify the geographic position coordinates of the aircraft pulling system.

* * * * *